United States Patent [19]

Hirao et al.

[11] Patent Number: 5,426,170
[45] Date of Patent: Jun. 20, 1995

[54] METHOD FOR PREPARING AN AROMATIC POLYCARBONATE

[75] Inventors: Motokazu Hirao; Yoshiyuki Totani; Tomonori Ito; Masakatsu Nakatsuka, all of Yokohama; Akihiro Yamaguchi, Kamakura, all of Japan

[73] Assignee: Mitsui Toatsu Chemicals, Inc., Tokyo, Japan

[21] Appl. No.: 158,518

[22] Filed: Nov. 29, 1993

[30] Foreign Application Priority Data

Dec. 2, 1992 [JP] Japan .................. 4-323435
Mar. 29, 1993 [JP] Japan .................. 5-069660

[51] Int. Cl.⁶ .............................. C08G 64/00
[52] U.S. Cl. .................... 528/198; 528/196; 528/371
[58] Field of Search .......... 528/196, 198, 371

[56] References Cited

U.S. PATENT DOCUMENTS

| | | | |
|---|---|---|---|
| 3,275,601 | 9/1966 | Schnell et al. | 528/196 |
| 3,974,126 | 8/1976 | Narita et al. | 528/196 |
| 4,737,573 | 4/1988 | Silva et al. | 528/371 |
| 4,743,676 | 5/1988 | Silva et al. | 528/371 |
| 4,880,896 | 11/1989 | Otsubo et al. | 528/196 |
| 4,939,230 | 7/1990 | Munjal et al. | 528/198 |
| 4,973,664 | 11/1990 | Silva | 528/371 |
| 5,034,505 | 7/1991 | Silva et al. | 528/371 |
| 5,043,203 | 8/1991 | Fyvie et al. | 528/198 |
| 5,182,361 | 1/1993 | van Hout et al. | 528/371 |

FOREIGN PATENT DOCUMENTS

| | | |
|---|---|---|
| 014323 | 8/1980 | European Pat. Off. . |
| 502515 | 9/1992 | European Pat. Off. . |
| 62-89723 | 4/1987 | Japan . |
| 2-147627 | 6/1990 | Japan . |
| 3-109420 | 5/1991 | Japan . |

Primary Examiner—John Kight, III
Assistant Examiner—Terressa Mosley
Attorney, Agent, or Firm—Burns, Doane, Swecker & Mathis

[57] ABSTRACT

1. A method for preparing an aromatic polycarbonate having less content of a low molecular weight oligomer which comprises the steps of:

(A) conducting an interfacial polymerization reaction in a reaction system comprising at least one aromatic dihydroxy compound, a carbonate precursor, an alkali metal or alkaline earth metal base, water and an organic solvent in the absence of an endcapping agent, and (B) conducting an interfacial polymerization reaction with the addition of an endcapping agent after at least one of the following parameters reaches a predetermined value:

(1) a weight-average molecular weight of a prepolymer obtained in step A, (2) a residual amount of the aromatic dihydroxy compound which is contained in the reaction mixture obtained in step A, (3) an amount ratio of a bishaloformate compound to a prepolymer wherein the bishaloformate compound is a bishaloformate derivative of a dihydroxy compound and is contained in the reaction mixture obtained in step A.

21 Claims, No Drawings

METHOD FOR PREPARING AN AROMATIC POLYCARBONATE

BACKGROUND OF THE INVENTION

1. Field of the Invention

The present invention relates to an aromatic polycarbonate and the production method thereof. More particularly, it relates to an aromatic polycarbonate having less content of a low molecular weight oligomer, a narrow molecular weight distribution and an excellent heat resistance and the production method thereof.

2. Description of the Related Art

Heretofore, it has been known to produce an aromatic polycarbonate by the use of an aromatic dihydroxy compound, a carbonate precursor, an alkali metal or alkaline earth metal base, water, an organic solvent, a polycarbonate formation catalyst (often called a polymerization catalyst or a polycondensation catalyst) and an endcapping agent (often called a molecular weight modifier, a polymerization terminator or a chain stopper).

U.S. Pat. No. 3,275,601 discloses a method for preparing an aromatic polycarbonate by the use of bisphenol A as an aromatic dihydroxy compound, phosgene as a carbonate precursor, sodium hydroxide as an alkali metal base, dichloromethane as an organic solvent, triethylamine as a polycarbonate formation catalyst and p-tert-butylphenol as an endcapping agent. According to the method, an aromatic polycarbonate is prepared by introducing an endcapping agent into a reaction system before adding phosgene.

U.S. Pat. No. 3,974,126 discloses a method for continuously preparing a polycarbonate having an improved molecular weight distribution. The method comprises reacting a mixture of a chloroformate oligomer, a dihydroxy compound and an endcapping agent in a turbulent flow until the viscosity of the polycarbonate reaches 10–90% of the final viscosity of 300–4000 cps and further reacting the mixture in a laminar flow until the viscosity of polycarbonate reaches a final viscosity. According to the method, an aromatic polycarbonate is prepared by adding an endcapping agent to a low molecular weight oligomer (a chloroformate oligomer).

Japanese Patent Application Laid-Open No. Sho 62-89,723 discloses a method for preparing a polycarbonate which comprises reacting an aqueous base solution containing an aromatic dihydroxy compound with phosgene in the presence of an organic solvent to form a low molecular weight polycarbonate and forming a high molecular weight polycarbonate in the reaction medium kept under emulsion conditions. According to the method, an endcapping agent is added before or immediately after introducing phosgene and the resulting low molecular weight polycarbonate is kept under emulsion conditions. Subsequently, when the concentration of the aromatic dihydroxy compound remaining in an aqueous phase shows the minimum, an endcapping agent is added again to carry out the polymerization resulting in forming a high molecular weight polycarbonate. The method is characterized in that before or immediately after introducing phosgene an endcapping agent is added to prepare an aromatic polycarbonate.

U.S. Pat. No. 4,737,573 discloses a method for preparing a linear polycarbonate. The method comprises (1) preparing a bischloroformate oligomer composition by passing phosgene into a mixture of water, an organic liquid and an aromatic dihydroxy compound, and simultaneously introducing an aqueous base solution at a rate to maintain the aqueous phase at a pH in the range of 8–11, (2) passing an endcapping agent and a polycarbonate formation catalyst into the mixture containing the compositions, and simultaneously introducing an aqueous base solution at a rate to maintain the aqueous phase of the mixture at a pH in the range of 11–12.5 to form a polycarbonate, and (3) recovering the linear polycarbonate to produce an aromatic polycarbonate. According to the method, an aromatic polycarbonate is prepared by adding an endcapping agent to a low molecular weight oligomer (a bischloroformate oligomer composition).

U.S. Pat. No. 4,743,676 discloses a method for preparing linear aromatic polycarbonates of controlled molecular weight. The method comprises (A) reacting an aromatic bischloroformate composition with an endcapping agent in an essentially phosgene-free reaction system comprising water, an organic solvent and a base to produce a partially capped bischloroformate composition, and (B) contacting said partially capped bischloroformate composition with a polycarbonate formation catalyst and an aqueous base solution to form a linear aromatic polycarbonate. According to the method, an aromatic polycarbonate is prepared by adding an endcapping agent to a low molecular weight oligomer (a bischloroformate composition).

U.S. Pat. No. 4,939,230 discloses a method for preparing a polycarbonate. The method comprises (A) forming a reaction mixture of an aromatic dihydroxy compound, a carbonate precursor, a solvent and a base, and (B) adding an endcapping agent to said mixture. In addition, the above-identified patent shows that the timing for adding an endcapping agent is when the reaction heat in the step A reaches a certain level. In other words, the addition of the endcapping agent is carried out immediately after introducing a carbonate precursor (cf. U.S. Pat. No. 4,722,995). Thus, according to the method, an aromatic polycarbonate is prepared by adding an endcapping agent to a low molecular weight oligomer.

U.S. Pat. No. 4,973,664 discloses a method for converting an aromatic bischloroformate composition to an aromatic polycarbonate having a predetermined weight-average molecular weight. The method comprises (A) partially capping said aromatic bischloroformate composition by the reaction with an endcapping agent in an amount to provide the desired molecular weight, and (B) contacting an organic solvent solution containing the partially capped bischloroformate composition with a polycarbonate formation catalyst, water and a base, the aqueous phase of the reaction mixture being buffered to maintain the pH thereof in the range of about 12–13. According to the method, an aromatic polycarbonate is prepared by adding an endcapping agent to a low molecular weight oligomer (an aromatic bischloroformate composition).

U.S. Pat. No. 5,034,505 discloses a method for preparing an aromatic polycarbonate. The method comprises (A) contacting an aromatic bischloroformate composition and an endcapping agent in a single step under reaction-promoting conditions in a heterogeneous reaction medium comprising water and an organic solvent by introducing a polycarbonate formation catalyst and a base into the mixture of the aromatic bischloroformate composition and the endcapping agent, said base being introduced without pH control and an amount thereof being at least stoichiometrically sufficient to convert all of the bischloroformate to polycarbonate of the desired molecular weight and to finally form a non-emulsified heterogeneous system, and (B) continuing the addition of a base incrementally as necessary to bring the pH of the aqueous phase of the reaction mixture to a value within the range of about 10-13. According to the method, an aromatic polycarbonate is prepared by adding an endcapping agent to a low molecular weight oligomer (an aromatic bischloroformate composition).

U.S. Pat. No. 5,043,203 discloses a method for preparing a polycarbonate using an endcapping agent of about 0.5-8 mole % based on one mole of aromatic dihydroxy compound. The method comprises (1) introducing phosgene into an agitated mixture comprising an aromatic dihydroxy compound at a temperature of about 15°-50° C. under interfacial reaction conditions and a pH between about 3-11.2, (2) continuing the phosgenation of the mixture and further introducing an aqueous base solution in accordance with a previously established set point between pH 3-10.5 comprising either of pH Control System A which adds an aqueous base solution at a rate sufficient to substantially maintain the mixture at the previously established pH set point, or a pH Control System B which adds an aqueous base solution at a rate sufficient to provide a ratio of moles of an aqueous base solution to moles of phosgene having a value of up to about 2.5, (3) allowing the introduction of an aqueous base solution to proceed in accordance with (2) until a sudden increase in base demand is noted with Control System A or a sudden decrease in pH of at least one unit is noted with respect to Control System B, (4) continuing the introduction of phosgene and an aqueous base solution in accordance with (3) until an additional 0.0025 to 0.09 mole of phosgene per mole of an aromatic dihydroxy compound is introduced, (5) discontinuing the introduction of phosgene and an aqueous base solution, while continuing to agitate the resulting mixture until the mixture is substantially free of phosgene, while the pH is maintained between about 4 to 8, (6) introducing an endcapping agent into the mixture and, after or with the addition of the endcapping agent, providing a proportion of from about 0.05 to 2 mole % of a tertiary organic amine per mole of an aromatic dihydroxy compound and a sufficient aqueous base solution to maintain the pH of the resulting mixture of between about 9 to 12, (7) proceeding the reaction of monochloroformate oligomer, and (8) recovering an aromatic polycarbonate from the reaction mixture. According to the method, an aromatic polycarbonate is prepared by adding an endcapping to a low molecular weight oligomer.

Japanese Pat. Laid-Open No. Hei 3-109420 discloses a method for continuously preparing a polycarbonate oligomer having a number-average molecular weight of 300-10000 by the reaction of an aqueous base solution containing an aromatic dihydroxy compound with phosgene in the presence of an organic solvent. The method comprises (1) supplying phosgene and an aqueous base solution containing an aromatic dihydroxy compound in tubular reactors pressurized to at least saturated vapor pressure of an organic solvent to conduct phosgenation reaction, an amount of the base being 0.9-1.5 equivalents based on the aromatic dihydroxy compound, and an amount of the aromatic dihydroxy compound being 0.55-0.95 mole based on the phosgene to effect phosgenation, (2) adding an endcapping agent at the inside of the tubular reactors or the outlets of the tubular reactors after the completion of the phosgenation reaction to conduct a partial termination reaction of the compound formed in (1) having chloroformate groups, (3) oligomerising the products in the next reactors until the reaction system has a pH of 5-10. According to the method, an aromatic polycarbonate is prepared by adding an endcapping agent to a low molecular weight oligomer (a compound having chloroformate groups).

European Pat. Publication No. 502515 discloses a method for preparing a polycarbonate resin having an OH/CO ratio of 0.25 or less found from a ratio of absorbances of terminal OH and CO measured by an infrared spectrophotometer. The method comprises emulsifying after adding an endcapping agent to an oligomer-containing reaction mixture obtained by the reaction of an aqueous base solution of an aromatic dihydroxy compound with phosgene in the presence of an organic solvent, and polymerizing while the reaction mixture is allowed to stand still in the emulsified state. According to the method, an aromatic polycarbonate is prepared by adding an endcapping agent to a low molecular weight oligomer (an oligomer).

U.S. Pat. No. 5,182,361 discloses a method for continuously preparing an aromatic polycarbonate having a high molecular weight by a boundary face condensation of a carbonate oligomer with a polycarbonate formation catalyst in the presence of an endcapping agent, a base, water and an organic solvent at a temperature of at most 70° C. The method comprises mixing components in static mixers to form a fine dispersion, reacting the dispersion in a residence zone with plug flow, and repeating this combination of the steps at least once. According to the method, an aromatic polycarbonate is prepared by adding an endcapping agent to a low molecular weight oligomer (a carbonate oligomer).

However, even though any of the above-mentioned methods is used, the resulting aromatic polycarbonates have a large content of a low molecular weight oligomer and a molecular weight distribution thereof is broad.

On the other hand, U.S. Pat. No. 4,880,896 discloses an aromatic polycarbonate having less content of a low molecular weight oligomer. However, this aromatic polycarbonate is obtainable by treating the aromatic polycarbonate with a poor solvent such as acetone, methyl ethyl ketone and the like after isolating an aromatic polycarbonate prepared by a conventional method.

Recently, there has been desired a method for preparing an aromatic polycarbonate having less content of a low molecular weight oligomer and a narrow molecular weight distribution.

SUMMARY OF THE INVENTION

Accordingly, it is an object of the present invention to provide an aromatic polycarbonate having less content of a low molecular weight oligomer and production method thereof.

It is another object of the present invention to provide an aromatic polycarbonate having a narrow molecular weight distribution and production method thereof.

In one aspect, the present invention provides a method for preparing an aromatic polycarbonate having less content of a low molecular weight oligomer which comprises the steps of:

(A) conducting an interfacial polymerization reaction in a reaction system comprising at least one aromatic dihydroxy compound, a carbonate precursor, an alkali metal or alkaline earth metal base, water and an organic solvent in the absence of an endcapping agent, and (B) conducting an interfacial polymerization reaction with the addition of an endcapping agent after at least one of the following parameters reaches a predetermined value:

(1) a weight-average molecular weight of a prepolymer obtained in step A, (2) a residual amount of the aromatic dihydroxy compound which is contained in the reaction mixture obtained in step A, (3) an amount ratio of a bishaloformate compound to a prepolymer wherein the bishaloformate compound is a bishaloformate derivative of a dihydroxy compound and is contained in the reaction mixture obtained in step A.

DESCRIPTION OF THE PREFERRED EMBODIMENTS

According to the present invention, there are used an aromatic dihydroxy compound, a carbonate precursor, an alkali metal or alkaline earth metal base, water, an organic solvent and an endcapping agent.

The preferred aromatic dihydroxy compounds employed in the method of the present invention are those having the formula (1) or (2)

$$HO-Ar_1-Y-Ar_2-OH \quad (1)$$

$$HO-Ar_3-OH \quad (2)$$

wherein each of $Ar_1$, $Ar_2$ and $Ar_3$ is a divalent aromatic group and Y is a bridging group to connect $Ar_1$ with $Ar_2$. In formula (1) or (2), each of $Ar_1$, $Ar_2$ and $Ar_3$ is a divalent aromatic group, preferably a substituted or unsubstituted phenylene group. A substituent of substituted phenylene groups includes halo, nitro, alkyl, cycloalkyl, alkenyl, aralkyl, aryl, alkoxy and the like. Both $Ar_1$ and $Ar_2$ are preferably p-, m- or o-phenylene, or one p-phenylene group and the other m- or o-phenylene. More preferably, both $Ar_1$ and $Ar_2$ are p-phenylene. $Ar_3$ is p-, m- or o-phenylene, preferably p- or m-phenylene. Y is a bridging group to connect $Ar_1$ with $Ar_2$ and includes a single bond, a divalent hydrocarbon group or a group containing atoms except for a combination of carbon hydrogen such as —O—, —S—, —SO—, —SO$_2$—, —CO— and the like. A divalent hydrocarbon group includes alkylidene such as methylene, ethylene, 2,2-propylidene, cyclohexylidene and the like, alkylidene substituted by aryl groups, and hydrocarbon groups containing an aromatic group or other unsaturated hydrocarbon groups.

Exemplary suitable aromatic dihydroxy compounds include:
bis(hydroxyaryl)alkanes such as
bis(4-hydroxyphenyl)methane
bis(2-methyl-4-hydroxyphenyl)methane
bis(3-methyl-4-hydroxyphenyl)methane
1,1-bis(4'-hydroxyphenyl)ethane
1,2-bis(4'-hydroxyphenyl)ethane
bis(4-hydroxyphenyl)phenylmethane
bis(4-hydroxyphenyl)diphenylmethane
bis(4-hydroxyphenyl)-1-naphthylmethane
1,1-bis(4'-hydroxyphenyl)-1-phenylethane
1,3-bis(4'-hydroxyphenyl)-1,1-dimethylpropane
2,2-bis(4'-hydroxyphenyl)propane ["Bisphenol A"]
2-(4'-hydroxyphenyl)-2-(3"-hydroxyphenyl)propane
1,1-bis(4'-hydroxyphenyl)-2-methylpropane
2,2-bis(4'-hydroxyphenyl)butane
1,1-bis(4'-hydroxyphenyl)-3-methylbutane
2,2-bis(4'-hydroxyphenyl)pentane
2,2-bis(4'-hydroxyphenyl)-4-methylpentane
2,2-bis(4'-hydroxyphenyl)hexane
4,4-bis(4'-hydroxyphenyl)heptane
2,2-bis(4'-hydroxyphenyl)octane
2,2-bis(4'-hydroxyphenyl)nonane
bis(3,5-dimethyl-4-hydroxyphenyl)methane
2,2-bis(3'-methyl-4'-hydroxyphenyl)propane
2,2-bis(3'-ethyl-4'-hydroxyphenyl)propane
2,2-bis(3'-n-propyl-4'-hydroxyphenyl)propane
2,2-bis(3'-isopropyl-4'-hydroxyphenyl)propane
2,2-bis(3'-sec-butyl-4'-hydroxyphenyl)propane
2,2-bis(3'-tert-butyl-4'-hydroxyphenyl)propane
2,2-bis(3'-cyclohexyl-4'-hydroxyphenyl)propane
2,2-bis(3'-allyl-4'-hydroxyphenyl)propane
2,2-bis(3'-methoxy-4'-hydroxyphenyl)propane
2,2-bis(3',5'-dimethyl-4'-hydroxyphenyl)propane
2,2-bis(2',3',5',6'-tetramethyl-4'-hydroxyphenyl)propane
2,2-bis(3'-chloro-4'-hydroxyphenyl)propane
2,2-bis(3',5'-dichloro-4'-hydroxyphenyl)propane
2,2-bis(3'-bromo-4'-hydroxyphenyl)propane
2,2-bis(3',5'-dibromo-4'-hydroxyphenyl)propane
2,2-bis(2',6'-dibromo-3',5'-dimetyl-4'-hydroxyphenyl)propane
bis(4-hydroxyphenyl)cyanomethane
3,3-bis(4'-hydroxyphenyl)-1-cyanobutane
2,2-bis(4'-hydroxyphenyl)hexafluoropropane and the like;
bis(hydroxyaryl)cycloalkanes such as
1,1-bis(4'-hydroxyphenyl)cyclopentane
1,1-bis(4'-hydroxyphenyl)cyclohexane
1,1-bis(3'-methyl-4'-hydroxyphenyl)cyclohexane
1,1-bis(3',5'-dimethyl-4'-hydroxyphenyl)cyclohexane
1,1-bis(3',5'-dichloro-4'-hydroxyphenyl)cyclohexane
1,1-bis(4'-hydroxyphenyl)-4-methylcyclohexane
1,1-bis(4'-hydroxyphenyl)-3,3,5-trimethylcyclohexane
1,1-bis(4'-hydroxyphenyl)cycloheptane
1,1-bis(4'-hydroxyphenyl)cyclooctane
1,1-bis(4'-hydroxyphenyl)cyclononane
1,1-bis(4'-hydroxyphenyl)cyclododecane
2,2-bis(4'-hydroxyphenyl)norbornane
8,8-bis(4'-hydroxyphenyl)tricyclo[5,2,1,0$^{2,6}$]decane
2,2-bis(4'-hydroxyphenyl)adamantane and the like;
bis(hydroxyaryl)ethers such as
4,4'-dihydroxydiphenylether
4,4'-dihydroxy-3,3'-dimethyldiphenylether
ethylene glycol bis(4-hydroxyphenyl)ether and the like;
bis(hydroxyaryl)sulfides such as
4,4'-dihydroxydiphenylsulfide
3,3'-dimethyl-4,4'-dihydroxydiphenylsulfide
3,3'-dicyclohexyl-4,4'-dihydroxydiphenylsulfide
3,3'-diphenyl-4,4'-dihydroxydiphenylsulfide
3,3',5,5'-tetramethyl-4,4'-dihydroxydiphenylsulfide
and the like;
bis(hydroxyaryl)sulfoxides such as
4,4'-dihydroxydiphenylsulfoxide
3,3'-dimethyl-4,4'-dihydroxydiphenylsulfoxide
and the like;
bis(hydroxyaryl)sulfones such as
4,4'-dihydroxydiphenylsulfone
3,3'-dimethyl-4,4'-dihydroxydiphenylsulfone
3,3'-diphenyl-4,4'-dihydroxydiphenylsulfone
3,3'-dichloro-4,4'-dihydroxydiphenylsulfone
and the like;
bis(hydroxyaryl)ketones such as bis(4-hydroxyphenyl)ketone
bis(3-methyl-4-hydroxyphenyl)ketone and the like;
and further
3,3,3',3'-tetramethyl-6,6'-dihydroxyspiro(bis)indan ["spirobiindanbisphenol"]
3,3',4,4'-tetrahydro-4,4,4',4'-tetramethyl-2,2'-spirobi (2H-1-benzopyran)-7,7'-diol ["spirobichroman"]
trans-2,3-bis(4'-hydroxyphenyl)-2-butene
9,9-bis(4'-hydroxyphenyl)fluorene
3,3-bis(4'-hydroxyphenyl)-2-butanone
1,6-bis(4'-hydroxyphenyl)-1,6-hexandione
1,1-dichloro-2,2-bis(4'-hydroxyphenyl)ethylene
1,1-dibromo-2,2-bis(4'-hydroxyphenyl)ethylene
1,1-dichloro-2,2-bis(3'-phenoxy-4'-hydroxyphenyl)ethylene
α,α,α',α'-tetramethyl-α,α'-bis(4-hydroxyphenyl)-p-xylene
α,α,α',α'-tetramethyl-α,α'-bis(4-hydroxyphenyl)-m-xylene
3,3-bis(4'-hydroxyphenyl)phthalide
2,6-dihydroxydibenzo-p-dioxin
2,6-dihydroxythianthrene
2,7-dihydroxyphenoxathiin
9,10-dimethyl-2,7-dihydroxyphenazine
3,6-dihydroxydibenzofuran
3,6-dihydroxydibenzothiophene
4,4'-dihydroxybiphenyl
1,4-dihydroxynaphthalene
1,5-dihydroxynaphthalene
2,6-dihydroxynaphthalene
2,7-dihydroxynaphthalene
2,7-dihydroxypyrene
hydroquinone
resorcin and the like.

Also are useful an aromatic dihydroxy compounds containing ester linkages prepared by reacting two molecules of bisphenol A with one molecule of isophthaloyl or terephthaloyl chloride. These may be used independently or jointly. In the method of the present invention, the preferred aromatic dihydroxy compound is bisphenol A.

The preferred carbonate precursor employed in the method of the present invention is carbonyl halide compounds or haloformate compounds.

As a carbonyl halide compound, usually a carbonyl chloride called phosgene is used. Also useful are carbonyl halide compounds derivable from halogens other than chlorine such as carbonyl bromide, carbonyl iodide, and carbonyl fluoride. In addition, there are useful compounds capable of forming a haloformate group such as trichloromethylchloroformate which is dimer of phosgene, and bis(trichloromethyl)carbonate which is trimer of phosgene. These compounds may be used independently or jointly. Usually, the preferred carbonyl halide compound is phosgene.

A haloformate compound is either a bishaloformate compound or a haloformate oligomer compound, and a representative compound thereof is shown by formula (3),

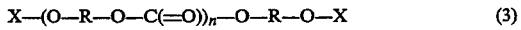

X—(O—R—O—C(=O))$_n$—O—R—O—X  (3)

wherein X is hydrogen or a halocarbonyl group, at least one X is a halocarbonyl group, R is a divalent aliphatic or aromatic group and n is 0 or a positive number. In the case where a compound shown in formula (3) is a bishaloformate compound, both X are halocarbonyl groups and n is 0. The compounds shown in formula (3) are bishaloformate compounds or haloformate oligomer compounds derivable from aliphatic dihydroxy compounds, bishaloformate compounds or haloformate oligomer compounds derivable from aromatic dihydroxy compounds. The haloformate oligomer compounds may contain a structurally different R within the same molecule. These above haloformate compounds may be used independently or as a mixture thereof. Moreover, these compounds may be used with halocarbonyl compounds.

In formula (3), a divalent aliphatic group R is a alkylene group having 2–20 carbon atoms, a cycloalkylene group having 4–12 carbon atoms or a group shown in formula (4)

—R'—Ar4—R'—  (4)

wherein R' is a alkylene group having 1–6 carbon atoms and Ar4 is a divalent aromatic group having 6–12 carbon atoms. In formula (3), when R is an aliphatic group, exemplary suitable aliphatic dihydroxy compounds include:
ethylene glycol
1,3-propanediol
1,4-butanediol
1,5-pentanediol
3-methyl-1,5-pentanediol
1,6-hexanediol
1,5-hexanediol
1,7-heptanediol
1,8-octanediol
1,9-nonanediol
1,10-decanediol
1,11-undecanediol
1,12-dodecanediol
neopentyl glycol
2-ethyl-1,6-hexanediol
2-methyl-1,3-propanediol
1,3-cyclohexanediol
1,4-cyclohexanediol
2,2-bis(4'-hydroxycyclohexyl)propane
xylylenediol
1,4-bis(2'-hydroxyethyl)benzene
1,4-bis(3'-hydroxypropyl)benzene
1,4-bis(4'-hydroxybutyl)benzene
1,4-bis(5'-hydroxypentyl)benzene
1,4-bis(6'-hydroxyhexyl)benzene and the like.

In formula (3), an aromatic dihydroxy compound in which R is an aromatic group is one shown in formula (1) or (2) such as bisphenol A and hydroquinone.

In the method of the present invention, the especially preferred carbonate precursor is phosgene, a bischloroformate derivative of bisphenol A or a chloroformate oligomer derivative of bisphenol A.

When carbonyl halide compounds are used as carbonate precursors, bishaloformate compounds which are bishaloformate derivatives of dihydroxy compounds in accordance with the present invention mean bishaloformate derivatives of aromatic dihydroxy compounds, that is, obtainable by reacting one molecule of aromatic dihydroxy compounds with two molecules of carbonyl halide compounds. In this case, the bishaloformate compounds are formed in the early stage of step A and the amount thereof ranges usually from about 10 to about 90 mole % based on one mole of the aromatic dihydroxy compounds. In the case where haloformate compounds are employed as carbonate precursors, bishaloformate compounds mean bishaloformate compounds wherein both X are a halocarbonyl groups and n is 0 in a compound shown in formula (3). In this case, the initial amount of the bishaloformate compounds ranges from about 10% by weight to about 100% by weight based on a total amount of the haloformate compounds.

A molar amount of carbonate precursors used is about 0.9 to about 2.0 times that of aromatic dihydroxy compounds when carbonyl halide compounds are used as carbonate precursors. On the other hand, when haloformate compounds are employed as carbonate precursors, the number of haloformate groups contained in the haloformate compounds is about 0.9 to about 1.5 equivalents based on that of hydroxy groups contained in the haloformate compounds and the aromatic dihydroxy compounds. In the method of the present invention, it is preferable that a reaction mixture obtained in step A is one in which the number of haloformate groups is excessive to the number of hydroxy groups. In this case, the molar amount of carbonate precursors used is usually about 1.01 to about 1.5 times that of aromatic dihydroxy compounds when carbonyl halide compounds are used as carbonate precursors.

On the other hand, when haloformate compounds are employed as carbonate precursors, it is preferable that the number of haloformate groups contained in the haloformate compounds is about 1.01 to about 1.3 equivalents based on that of hydroxy groups contained in the haloformate compounds and the aromatic dihydroxy compounds.

Carbonate precursors may be used in any state of gas, liquid and solid. When carbonyl halide compounds are used as carbonate precursors, it is preferable to use the carbonyl halide compounds as a gassy state or an organic solvent solution in which the carbonyl halide compounds are dissolved. On the contrary, when haloformate compounds are used as carbonate precursors, it is preferable to use the haloformate compounds as a liquid state, a solid state or an organic solvent solution in which the haloformate compounds are dissolved.

An alkali metal or alkaline earth metal base (hereinafter referred to as "base") employed in the method of the present invention is usually a hydroxide of an alkali metal or alkaline earth metal such as sodium hydroxide, potassium hydroxide, calcium hydroxide and the like. These compounds may be used independently or jointly. The preferred base is sodium hydroxide or potassium hydroxide.

An amount of bases used is preferably about 1.0 to about 1.6 equivalents based on that of aromatic dihydroxy compounds. Usually, a base is used as an aqueous solution. In addition, an aqueous solution in which aromatic dihydroxy compounds are dissolved may be used. In this case, there may be added an antioxidant such as sodium sulfite, sodium hydrosulfite, sodium borohydride and the like.

A whole amount of bases may be used in step A or partial amounts of bases may be used in step A and the remainder thereof may be used in step B simultaneously with or after the addition of an endcapping agent. Also, bases used in step A or B may be added at once, intermittently or continuously to a reaction system or may be added to a reaction system while controlling pH within a certain range or a certain pH value.

Water used in the method of the present invention may be a distilled water, an ion-exchange water, a recycled water obtained while preparing an aromatic polycarbonate, a mixture thereof. Water is preferably used as a base solution, a base solution containing aromatic dihydroxy compounds and/or a base solution containing endcapping agents.

An amount of water used is about 0.5 to about 5 liters based on one mole of aromatic dihydroxy compounds. When a base solution containing aromatic dihydroxy compounds is prepared, an amount of water used may be more than a necessary amount to dissolve aromatic dihydroxy compounds and bases. For example, when an aromatic dihydroxy compound is bisphenol A, an amount of water is about 0.8 to about 2.2 liters based on one mole of bisphenol A.

An organic solvent employed in the method of the present invention is preferably substantially inert against reaction, substantially water-insoluble and capable of dissolving an aromatic polycarbonate. An organic solvent, for example, includes:
aliphatic hydrocarbon chlorides such as
dichloro methane
chloroform
1,2-dichloroethane
1,2-dichloroethylene
trichloroethane
tetrachloroethane
dichloropropane and the like;
aromatic hydrocarbon chlorides such as
chlorobenzene
dichlorobenzene and the like;
or a mixture thereof.

In addition, the above-mentioned hydrocarbon chlorides or a mixture thereof may be mixed with aromatic hydrocarbons such as toluene, xylene, ethylbenzene and the like or aliphatic hydrocarbons such as hexane, heptane cyclohexane and the like. As an organic solvent, dichloromethane is especially preferred. Moreover, an organic solvent used in the method of the present invention may be a recycled organic solvent obtained when preparing an aromatic polycarbonate, or the recycled organic solvent may be mixed with a new organic solvent.

In usual, the amount of an organic solvent used is preferably set to make the concentration of an aromatic polycarbonate in an organic solvent solution containing the aromatic polycarbonate when polymerization is completed about 5 to about 35% by weight, more preferably about 10 to about 20% by weight.

According to the present invention, an endcapping agent reacts with end groups of prepolymer produced in step A so as to cap the ends thereof when an aromatic polycarbonate is prepared. The end group of the prepolymer is either haloformate groups or hydroxy groups.

An endcapping agent may be monovalent aromatic hydroxy compounds, haloformate derivatives of monovalent aromatic hydroxy compounds, monovalent carboxylic acids, halide derivatives of monovalent carboxylic acids and the like. For example, monovalent aromatic hydroxy compounds include:
phenols such as
phenol
p-cresol
o-ethylphenol
p-ethylphenol
p-isopropylphenol
p-tert-butylphenol
p-cumylphenol
p-cyclohexylphenol
p-octylphenol
p-nonylphenol 2,4-xylenol
p-methoxyphenol
p-hexyloxyphenol
p-decyloxyphenol
o-chlorophenol
m-chlorophenol
p-chlorophenol
p-bromophenol
pentabromophenol
pentachlorophenol
p-phenylphenol
p-isopropenylphenol
2,4-bis(1'-methyl-1'-phenylethyl)phenol
β-naphthol
α-naphthol
p-(2',4',4'-trimethylchromanyl)phenol
2-(4'-methoxyphenyl)-2-(4''-hydroxyphenyl)propane
and the like;
alkali metal or alkaline earth metal salts thereof.
Haloformate derivatives of monovalent aromatic hydroxy compounds mean haloformate derivatives of the abovementioned monovalent aromatic hydroxy compounds and the like.

Monovalent carboxylic acids, for example, include:
aliphatic acids such as
acetic acid
propionic acid
butyric acid
valeric acid
caproic acid
heptanoic acid
caprylic acid
2,2-dimethylpropionic acid
3-methylbutyric acid
3,3-dimethylbutyric acid
4-methylvaleric acid
3,3-dimethylvaleric acid
4-methylcaproic acid
2,4-dimethylvaleric acid
3,5-dimetylcaproic acid
phenoxyacetic acid and the like;
alkali metal or alkaline earth metal salts thereof;
benzoic acids such as
benzoic acid
p-methylbenzoic acid
p-tert-butylbenzoic acid
p-propyloxybenzoic acid
p-butoxybenzoic acid
p-hexyloxybenzoic acid
p-octyloxybenzoic acid
p-phenylbenzoic acid
p-benzylbenzoic acid
p-chlorobenzoic acid and the like;
alkali metal or alkaline earth metal salts thereof.
Halide derivatives of monovalent carboxylic acids mean halide derivatives of the above-mentioned monovalent carboxylic acids and the like.

These compounds may be used independently or jointly. The preferred endcapping agent is phenol, p-tert-butylphenol or p-cumylphenol.

By the amount of endcapping agents used, a weight-average molecular weight to be reached finally is decided. Weight-average molecular weights to be reached finally lie usually in the range of about 15000 to about 150000, preferably about 20000 to about 100000, more preferably about 25000 to about 90000, especially preferably about 30000 to about 80000. An amount of endcapping agents necessary to prepare an aromatic polycarbonate having the above-mentioned range of weight-average molecular weights is about 1.0 to about 10.0 mole %, preferably about 1.5 to about 8.0 mole %, more preferably about 1.7 to about 7.0 mole %, especially preferably about 2.0 to about 6.0 mole % based on one mole of aromatic dihydroxy compounds. An endcapping agent may be used as a solid or liquid state, an organic solvent solution, an aqueous solution or an aqueous base solution.

In the method of the present invention, timing for adding an endcapping agent is of importance and the timing for adding is after at least one of three factors in the method of the present invention reaches a predetermined value. Thus, a method in accordance with the present invention comprises the steps of:

(A) conducting an interfacial polymerization reaction in a reaction system comprising at least one aromatic dihydroxy compound, a carbonate precursor, a base, water and an organic solvent in the absence of an endcapping agent, and (B) conducting an interfacial polymerization reaction with the addition of an endcapping agent after at least one of the following parameters reaches a predetermined value:

(1) a weight-average molecular weight of a prepolymer obtained in step A, (2) a residual amount of the aromatic dihydroxy compound which is contained in the reaction mixture obtained in step A, (3) an amount ratio of a bishaloformate compound to a prepolymer wherein the bishaloformate compound is a bishaloformate derivative of a dihydroxy compound and is contained in the reaction mixture obtained in step A.

The present invention is based on a new knowledge that an endcapping agent reacts with preferentially a low molecular weight oligomer, especially an aromatic dihydroxy compound or a bishaloformate compound. When an endcapping agent is added to a reaction mixture having a large content of a low molecular weight oligomer, the endcapping agent reacts with the low molecular weight oligomer, especially the aromatic dihydroxy compound or the bishaloformate compound, and therefore, a large amount of both-sides-capped low molecular weight oligomer is formed. Accordingly, the preferred timing for adding is after an interfacial polymerization reaction in step A proceeds up to a certain degree and there is formed a reaction mixture which have less content of a low molecular weight oligomer, especially an aromatic dihydroxy compound or a bishaloformate compound. As a factor that decides the timing for adding an endcapping agent, each factor of (1), (2) and (3) is important, respectively and it is especially important to add an endcapping agent after at least one of the above-mentioned factors reaches a predetermined value. That is, when an endcapping agent is added after at least one of (1), (2) and (3) reaches a predetermined value shown below, an aromatic polycarbonate having less content of a low molecular weight oligomer and a narrow molecular weight distribution can be prepared as compared with the case where an endcapping agent is added before all (1), (2) and (3) reach a predetermined value shown below. A molecular weight of the low molecular weight oligomer in the aromatic polycarbonate is preferably 3000 or less, and the content thereof is preferably less than 3 wt %, more preferably less than 2 wt %, most preferably less than 1 wt %.

The timing when a predetermined value becomes a preferable one, that is, the preferred timing for adding the endcapping agent, is after at least one of the following conditions is met:

(1) the weight-average molecular weight of the prepolymer obtained in step A reaches 20% or more of that to be reached finally, (2) the residual amount of the aromatic dihydroxy compound which is contained in the reaction mixture obtained in step A reaches 3% by weight or less of an initial amount, (3) the amount of the bishaloformate compound contained in the reaction mixture obtained in step A reaches 3% by weight or less based on the prepolymer wherein the bishaloformate compound is a bishaloformate derivative of the dihydroxy compound.

As far as (1) above is concerned, the timing for adding the endcapping agent is more preferably when the weight-average molecular weight of the prepolymer obtained in step A reaches 20 to 99% of that to be reached finally, further preferably 35 to 95%, especially preferably 40 to 90%. The most preferred timing for adding the endcapping agent is when the weight-average molecular weight of the prepolymer obtained in step A is 50 to 90%.

With respect to (2) above, the timing for adding the endcapping agent is more preferably after the residual amount of the aromatic dihydroxy compound which is contained in the reaction mixture obtained in step A reaches 1% by weight or less of an initial amount.

Concerning (3) above, the timing for adding the endcapping agent is more preferably after the amount of the bishaloformate compound contained in the reaction mixture obtained in step A reaches 1% by weight or less based on the prepolymer.

Moreover, the timing for adding the endcapping agent is more preferably after the residual amount of the aromatic dihydroxy compound reaches 3% by weight or less of an initial amount and the amount of the bishaloformate compound reaches 3% by weight or less based on the prepolymer, further more preferably after the residual amount of the aromatic dihydroxy compound reaches 1% by weight or less of an initial amount and the amount of the bishaloformate compound reaches 1% by weight or less based on the prepolymer.

By adding an endcapping agent at the above-mentioned timing, it is possible to prepare an aromatic polycarbonate which has an amount less than 1% by weight of a low molecular weight oligomer having a molecular weight of 3000 or less and has a weight-average molecular weight of about 15000 to about 150000, preferably about 20000 to about 100000, more preferably about 25000 to about 90000, further more preferably about 30000 to about 80000. This kind of an aromatic polycarbonate has never been prepared by a conventional method before.

In step A of the present method, an interfacial polymerization reaction is conducted in the absence of an endcapping agent. In said step, a low molecular weight oligomer is formed at an initial stage of the reaction. A low molecular weight oligomer in accordance with the present invention is preferably a low molecular weight compound having a molecular weight of 3000 or less. While the interfacial polymerization reaction proceeds, an amount of the low molecular weight oligomer decreases and a weight-average molecular weight increases and then a prepolymer is formed. According to the present invention, a prepolymer means an aromatic polycarbonate obtained in step A wherein the end groups of the aromatic polycarbonate are not capped. At the timing when an endcapping agent is added, weight-average molecular weights of prepolymers lie in the range of about 3000 to about 150000, preferably about 4000 to about 99000, more preferably about 10000 to about 81000, further more preferably about 15000 to about 72000. Also, a prepolymer means a polymer component obtained by taking out a part of the reaction mixture obtained in step A, separating an organic phase after separation on standing still, neutralizing with an acid and distilling away an organic solvent after washing with water until electrolytes disappear. By analyzing the prepolymer, a weight-average molecular weight thereof and amounts of bishaloformate compounds based on the prepolymer can be determined.

In step B of the present invention, an endcapping agent is added to a reaction mixture obtained in step A and then three parameters are determined by the following methods.

(1) As a method for determining weight-average molecular weights of prepolymers obtained in step A, there are some methods such as GPC (gel permeation chromatography) and the like. A weight-average molecular weight of a prepolymer increases as the interfacial polymerization reaction in step A proceeds. After the above molecular weight reaches a predetermined value in the process, an endcapping agent is added. A predetermined value is indicated as a ratio (degree of attainment %) of a weight-average molecular weight of a prepolymer based on a weight-average molecular weight to be reached finally.

(2) A residual amount of an aromatic dihydroxy compound contained in a reaction mixture obtained in step A means a residual amount of an aromatic dihydroxy compound used in step A. The amount can be determined by analyzing a part of an aqueous phase taken out of a reaction mixture obtained in step A with high performance liquid chromatography (HPLC), ultraviolet absorption spectrum or the like. A residual amount of an aromatic dihydroxy compound decreases as an interfacial polymerization reaction proceeds. After the residual amount reaches a predetermined value in the process, an endcapping agent is added. A predetermined value is indicated as a ratio (% by weight) of a residual amount of an aromatic dihydroxy compound contained in a reaction mixture obtained in step A to the initial amount (a used amount).

(3) As a method for determining the amount ratio of bishaloformate compounds to prepolymers wherein the bishaloformate compounds and are contained in the reaction mixture obtained in step A, there are used some methods such as GPC, high performance liquid chromatography or the like. Although there is a large amount of bishaloformate compounds at the initial stage of reaction, the amount thereof decreases as the reaction proceeds. In the process where the amount decreases, an endcapping agent is added after a predetermined value is reached. Since bishaloformate compounds are contained in prepolymers, a predetermined value is indicated as an amount ratio (% by weight) of the bishaloformate to the whole amount of the prepolymer.

Although the method of the present invention can be carried out without using a polycarbonate formation catalyst, it is preferable to use a polycarbonate formation catalyst due to the reduction of the polymerization time. A polycarbonate formation catalyst suitable for the method of the present invention includes a tertiary amine, a quaternary ammonium salt, a tertiary phosphine, a quaternary phosphonium salt, a nitrogen-containing heterocyclic compound and salt thereof, an imino ether and salt thereof, a compound having amido groups and the like.

Exemplary suitable polycarbonate formation catalysts include:
trimethylamine
triethylamine
tri-n-propylamine
diethyl-n-propylamine
tri-n-butylamine
tri-n-hexylamine
N,N-dimethylbenzylamine
N,N,N',N'-tetramethyl-1,4-tetramethylenediamine
N,N,N',N'-tetra-n-butyl-1,6-hexamethylenediamine
N,N-dimethylcyclohexylamine
N,N-diethylcyclohexylamine
N,N-dimethylaniline
N,N-diethylaniline
4-dimethylaminopyridine
4-pyrrolidinopyridine
N,N'-dimethylpiperazine
N-ethylpiperidine
N-methylmorpholine
1,4-diazabicyclo[2,2,2]octane
benzyltrimethylammonium chloride
benzyltriethylammonium chloride
tetramethylammonium chloride
tetraethylammonium bromide
methyltriethylammonium chloride
phenyltriethylammonium chloride
tetramethylammonium hydroxide
triethyl-n-octadecylammonium chloride
benzyltri-n-butylammonium chloride
cyclohexyltrimethylammonium bromide
benzyltrimethylammonium fluoride
tetra-n-butylammonium fluoride
benzyldimethylphenylammonium chloride
tetra-n-heptylammonium iodide
m-trifluoromethylphenyltrimethylammoniumbromide
triethylphosphine
triphenylphosphine
diphenylbutylphosphine
diphenyloctadecylphosphine
diphenylbenzylphosphine
tris(p-chlorophenyl)phosphine
phenylnaphtylbenzylphosphine
tetra(hydroxymethyl)phosphonium chloride
benzyltriethylphosphonium chloride
benzyltriphenylphosphonium chloride
4-metylpyridine
1-methylimidazole
1,2-dimethylimidazole
3-methylpyridazine
4,6-dimethylpyrimidine
1-cyclohexyl-3,5-dimethylpyrazole
2,3,5,6-tetramethylpyrazine and the like.

These compounds may be used independently or jointly. As to a polycarbonate formation catalyst, it is preferable to use a tertiary amine, more preferably a tertiary amine having 3 to 30 carbon atoms, further more preferably triethylamine.

An amount of polycarbonate formation catalysts used may be more than 0.0005 mole % based on one mole of aromatic dihydroxy compounds. Also, even if the amount thereof is excessive, an outstanding effect can not be expected. The amount of the polycarbonate formation catalysts ranges preferably from about 0.0005 to about 5 mole % based on one mole of aromatic dihydroxy compounds. The polycarbonate formation catalysts may be used as not only a liquid or solid state but also an organic solvent solution or an aqueous solution.

A polycarbonate formation catalyst may be used either in step A or B and in both step A and B. In the case where a polycarbonate formation catalyst is used in step A, the catalyst may exist in a reaction system from the beginning of the reaction and the catalyst may be also added to the reaction system at any point. When a carbonyl halide compound is used as a carbonate precursor, it is preferable that a polycarbonate formation catalyst is added to the reaction system after the carbonyl halide compound is fed. On the other hand, when a haloformate compound is used as a carbonate precursor, it is preferable that a polycarbonate formation catalyst exists in the reaction system from the beginning of the reaction. When a polycarbonate formation catalyst is used in step B, the catalyst may be added simultaneously with or after the addition of an endcapping agent.

According to the present invention, a branched aromatic polycarbonate can be produced by the use of a branching agent. A branching agent suitable for the present invention is a compound having at least three similar or dissimilar reaction groups selected from aromatic hydroxy groups, haloformate groups, carboxylic acid groups, carboxylic acid halide groups, active halogen atoms and the like.

Exemplary suitable branching agents include:
phloroglucinol
4,6-dimethyl-2,4,6-tris(4'-hydroxyphenyl)-2-heptene
4,6-dimethyl-2,4,6-tris(4'-hydroxyphenyl)heptane
1,3,5-tris(4'-hydroxyphenyl)benzene
1,1,1-tris(4'-hydroxyphenyl)ethane
1,1,2-tris(4'-hydroxyphenyl)propane
$\alpha,\alpha,\alpha'$-tris(4'-hydroxyphenyl)-1-ethyl-4-isopropylbenzene
2,4-bis[$\alpha$-methyl-$\alpha$-(4'-hydroxyphenyl)ethyl]phenol
2-(4'-hydroxyphenyl)-2-(2'',4''-dihydroxyphenyl)propane
tris(4-hydroxyphenyl)phosphine
1,1,4,4-tetrakis(4'-hydroxyphenyl)cyclohexane
2,2-bis[4',4'-bis(4''-hydroxyphenyl)cyclohexyl]propane
$\alpha,\alpha,\alpha',\alpha'$-tetrakis(4'-hydroxyphenyl)-1,4-diethylbenzene
2,2,5,5-tetrakis(4'-hydroxyphenyl)hexane
1,1,2,3-tetrakis(4'-hydroxyphenyl)propane
1,4-bis(4',4''-dihydroxytriphenylmethyl)benzene
3,3',5,5'-tetrahydroxydiphenylether
3,5-dihydroxybenzoic acid
3,5-bis(chlorocarbonyloxy)benzoic acid
4-hydroxyisophthalic acid
4-chlorocarbonyloxyisophthalic acid
5-hydroxyphthalic acid
5-chlorocarbonyloxyphthalic acid
trimesic acid trichloride
cyanuric acid chloride
3,3-bis(4'-hydroxyphenyl)-2-oxo-2,3-dihydroindole
3,3-bis(4'-hydroxy-3'-methylphenyl)-2-oxo-2,3-dihydroindole and the like.

These compounds may be used independently or jointly.

An amount of the branching agents varies depending on the degree of branching of an aromatic polycarbonate to be produced. Preferably, the amount is about 0.05 to about 2.0 mole % based on one mole of aromatic dihydroxy compounds. A branching agent may be used in a solid or liquid state and may be also used as an organic solvent solution, an aqueous solution or an aqueous base solution. The timing for adding a branching agent is not limited specifically. Thus, a branching agent may be added in advance before reaction or may be added at any point during reaction.

Usually, increasing the amount of a branching agent tends to broaden a molecular weight distribution. However, when the same amount of a branching agent is used, a branched aromatic polycarbonate prepared in accordance with the present invention has less content of a low molecular weight oligomer and narrower molecular weight distribution than a branched polycarbonate prepared in a conventional method.

According to the present invention, an aromatic polycarbonate is usually produced at a temperature between about 10° C. and a boiling point of an organic solvent employed. Although the method of the present invention is usually carried out at atmospheric pressure, the present method may be carried out under the conditions of below or over atmospheric pressure.

According to the present invention, it is possible to conduct an interfacial polymerization reaction without stirring a reaction mixture, but it is preferable to conduct the reaction with stirring which contributes to reducing the polymerization time. In this case, it is not necessary to continue stirring the reaction mixture from the beginning of the interfacial polymerization to the end and it is sufficient to stir the reaction mixture so as to prevent the separation of an organic phase and an aqueous phase. Usually, the preferred stirring conditions are that an organic phase and an aqueous phase are mixed uniformly. In addition, if desired, the interfacial polymerization may be conducted with vigorous stirring. An interfacial polymerization reaction in the present specification includes all reactions that occur when an aromatic polycarbonate is produced in accordance with the present invention and these reactions occur mainly in the interface of an organic phase and an aqueous phase.

According to the present invention, the production method may be carried out in a batchwise or continuous operation. In the present production method, a variety of reaction apparatus can be used such as a tank-type reactor, a tubular reactor, a packed column, a static mixer, a vigorous stirring line mixer and the like or a combination thereof.

The present production method can be carried out in a batchwise operation using a tank-type reactor. For example, a carbonate precursor or an organic solvent solution containing a carbonate precursor is fed to a reaction system containing an aromatic dihydroxy compound, a base, water and an organic solvent. After feeding is completed, until at least one of the above-mentioned (1), (2) and (3) reaches a predetermined value, an interfacial polymerization is conducted and step A is carried out. Subsequently, step B is carried out by adding an endcapping agent and conducting a further interfacial polymerization. In this case, a polycarbonate formation catalyst may be employed in step A and/or step B. Also, a base may be used all at once in step A or part of a base may be used in step A and the rest thereof may be used in step B.

The present production method can be carried out in a semibatchwise operation using a tank-type reactor. For example, an aqueous base solution containing an aromatic dihydroxy compound, an organic solvent and a carbonate precursor or an organic solvent solution containing a carbonate precursor are fed continuously to a reaction system. After feeding is completed, until at least one of the above-mentioned (1), (2) and (3) reaches a predetermined value, an interfacial polymerization is conducted and step A is carried out. Subsequently, step B is carried out by adding an endcapping agent and conducting a further interfacial polymerization. In this case, a polycarbonate formation catalyst and a base are used in the same way as in the case of a batchwise operation.

By the use of a continuous tank-type reaction apparatus that several tank-type reactors are continuously connected, the present production method can be carried out in a continuous operation. For example, an aqueous base solution containing an aromatic dihydroxy compound, a carbonate precursor and an organic solvent or an organic solvent solution containing a carbonate precursor is continuously fed to the first tank. After the reaction mixture stays at the first tank for a certain residence time, the mixture is continuously supplied to the second tank. In the same manner as above, after the reaction mixture stays at a tank for a certain residence time, the mixture is continuously supplied to the next tank and an aromatic polycarbonate is prepared. On the occasion, an endcapping agent is continuously added to an optional tank after at least one of the above-mentioned (1), (2) and (3) reaches a predetermined value. In this case, one or plural reaction tanks before an endcapping agent is added correspond to the reaction apparatus where an interfacial polymerization reaction in step A is conducted, and one or plural reaction tanks after an endcapping agent is added correspond to the reaction apparatus where an interfacial polymerization reaction in step B is conducted. A polycarbonate formation catalyst and a base are used in the same way as in the case of a batchwise operation. By the use of a tank-type continuous reaction apparatus as described above, it is possible to produce continuously an aromatic polycarbonate having a stable molecular weight and molecular weight distribution.

By the use of a tubular reactor, the present production method can be also carried out in a continuous operation. In this case, the present production method can be carried out in the same operation as in the case of using a tank-type continuous reaction apparatus. On the occasion, an endcapping agent is continuously fed from an optional position of a tube after at least one of the above-mentioned (1), (2) and (3) reaches a predetermined value.

According to the present invention, the production method may be carried out in a semibatchwise operation or a continuous operation by the use of a continuous reaction apparatus comprising at least one of a tank-type reactor, a tubular reactor, a packed column, a static mixer, vigorous stirring line mixer and the like. For example, in the early stage of reaction, there is equipped a tubular reactor, a packed column or an apparatus causing an initial contact of a reaction solution and the like to continuously prepare a low molecular weight oligomer. Subsequently, an interfacial polymerization reaction is conducted further using a tank-type reactor, a tubular reactor, a static mixer, a vigorous stirring line mixer or the like. Then, an endcapping agent is added to an optional reaction apparatus after at least one of the above-mentioned (1), (2) and (3) reaches a predetermined value and the interfacial polymerization reaction is continued furthermore. It should be noted that step A corresponds to a reaction apparatus before adding an endcapping agent and step B corresponds to a reaction apparatus after adding the endcapping agent. By an operation described as above, the production of the present invention is carried out.

A reaction mixture containing an aromatic polycarbonate prepared in accordance with the present invention is treated by a continuous operation or a batchwise operation and the aromatic polycarbonate is recovered. The reaction mixture is treated by separating an organic phase containing the aromatic polycarbonate and an aqueous phase and if necessary, washing the organic phase containing the aromatic polycarbonate with water or a dilute alkali aqueous solution. Subsequently, the organic phase containing the aromatic polycarbonate is neutralized by a dilute acid aqueous solution. On the occasion, acids used include:
mineral acids such as
hydrochloric acid
sulfuric acid
phosphoric acid and the like, and
other acids.

Then, water-washing is continued repeatedly until electrolytes substantially disappear. By the use of a known method, the aromatic polycarbonate is recovered from the washed organic solvent solution containing the aromatic polycarbonate.

There are some methods to recover an aromatic polycarbonate such as a method for removing an organic solvent by distillation or steam distillation, a method for solidifying the aromatic polycarbonate by adding an organic solvent not to dissolve the aromatic polycarbonate (a poor solvent) to the organic solvent solution containing the aromatic polycarbonate and separating the organic solvent by filtration and the like from the obtained organic solvent slurry containing the aromatic polycarbonate and the like.

More exemplarily, the recovering methods include:
a method comprising removing the organic solvent by distillation from the organic solvent solution containing the aromatic polycarbonate, crystallizing the aromatic polycarbonate by saturating the organic solvent solution containing the aromatic polycarbonate, crushing the aromatic polycarbonate thus crystallized, and removing the organic solvent by drying the aromatic polycarbonate, a method comprising heating the organic solvent solution containing the aromatic polycarbonate while removing the organic solvent and pelletizing the aromatic polycarbonate directly from the molten state, a method comprising feeding the organic solvent solution containing the aromatic polycarbonate into a warm water, removing the organic solvent and crushing gel-like substances thus generated, a method comprising adding a poor or non-solvent and water to the organic solvent solution containing the aromatic polycarbonate and concentrating said solution with heating to obtain the solid aromatic polycarbonate as a water-slurry, a method comprising adding the organic solvent solution containing the aromatic polycarbonate to a warm water containing aromatic polycarbonate powder and removing the organic solvent by evaporation to obtain the solid aromatic polycarbonate as a water-slurry, a method comprising feeding an organic solvent solution containing an aromatic polycarbonate to a warm water containing aromatic polycarbonate powder and the poor solvent and evaporating away the organic solvent to obtain the solid aromatic polycarbonate as a water-slurry, and the like.

Exemplary suitable poor or non-solvents include:
aromatic hydrocarbons such as
toluene
xylene and the like,
aliphatic hydrocarbons such as
pentane
hexane
octane
cyclohexane
methylcyclohexane and the like,
alcohols such as
methanol
ethanol
propanol
butanol
pentanol
hexanol and the like,
ketones such as
acetone
methylethylketone
diethylketone
methylisobutylketone
cyclohexanone and the like,
esters such as
ethyl acetate
butyl acetate
amyl acetate and the like.

An aromatic polycarbonate produced according to the method of the present invention may be used independently or with other polymers as a molding material, Exemplary suitable other polymers include:
polyethylene
polypropylene
polystyrene
ABS resin
poly(methyl methacrylate)
poly(trifluoro ethylene)
poly(tetrafluoro ethylene)
polyacetal
poly(phenylene oxide)
poly(butylene terephthalate)
poly(ethylene terephthalate)
polyamide
polyimide
polyamideimide
polyetherimide
polysulfone
polyethersulfone
para-hydroxybenzoyl type polyester
polyarylate
polysulfide and the like.

At least one of known additives may be added to the aromatic polycarbonate produced by the present invention upon or after producing the aromatic polycarbonate where the aromatic polycarbonate may be employed alone or in combination with other polymers. The addition may be effected according to conventional manners.

Examples of the additives include pigments, dyes, process and heat stabilizers, antioxidants, hydrolysis stabilizers, impact-resistant stabilizers, ultraviolet absorbents, mold release agents, organic halide compounds, alkali metal sulfonates, glass fibers, carbon fibers, glass beads, barium sulfates, $TiO_2$ and the like.

An aromatic polycarbonate prepared in accordance with the present invention is soluble in specific solvents (for example, hydrocarbon halide solvents such as dichloromethane and the like) and it is possible to make molded articles such as a film from the organic solvent solution containing the aromatic polycarbonate. The aromatic polycarbonate produced by the present invention is thermoplastic and can be shaped easily from the melt thereof by known shaping methods such as injection molding, extrusion, blow molding, laminating and the like. The aromatic polycarbonate produced by the present invention may be used independently or with other polymers and if necessary, with the addition of additives as above so as to fabricate various molded articles.

Examples of the molded articles include chassis and housing materials for electric equipments and the like, electronic parts, automobile parts, glass-alternative building materials, substrates of information-recording medium such as disks for storing data, compact disks for audio use or the like, optical materials such as lenses for cameras or glasses and the like.

The present invention is explained in detail by the following examples and the present invention, however, is not limited by these examples.

EXAMPLE 1

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension were added 1.5 liters of an aqueous solution containing sodium hydrosulfite 1.8 g and sodium hydroxide 442 g (11.04 moles), and bisphenol A was dissolved therein at 15° C.

Phosgene 471 g (4.76 moles) was fed to said mixture with stirring over 30 min. Then, triethylamine 0.08 g (0.02 mole % based on one mole of bisphenol A) was added to said mixture and then the resulting mixture was stirred for 15 min. To said mixture was added a dichloromethane solution 50 ml containing p-tert-butylphenol 2017 g (3.44 mole % based on one mole of bisphenol A) with stirring for 30 min and the reaction was completed.

Table 1 shows a weight-average molecular weight of prepolymer, a residual amount of bisphenol A and an amount of a bischlorohaloformate compound based on an amount of prepolymer when adding an endcapping agent.

Then, the reaction mixture was allowed to stand and an organic phase was separated therefrom. Moreover, the organic phase thus separated was neutralized with hydrochloric acid and then washed with water repeatedly until electrolytes disappeared. Toluene 2 liters and water 5 liters were added to the dichloromethane solution containing the resulting aromatic polycarbonate and then the resulting solution was heated up to 98° C. to distill away dichloromethane and toluene, and aromatic polycarbonate powder was obtained.

EXAMPLE 2

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 454 g (11.36 moles), and bisphenol A was dissolved therein at 15° C.

Phosgene 479 g (4.84 moles) was fed to said mixture over 30 min with stirring and said mixture was stirred for 20 min. To said mixture was added a dichloromethane solution 50 ml containing p-tert-butylphenol 20.7 g (3.44 mole % based on one mole of bisphenol A) and triethylamine 0.32 g (0.08 mole % based on one mole of bisphenol A), followed by stirring for 30 min and then the reaction was completed.

A further procedure was carried out in the same manner as in Example 1 and then aromatic polycarbonate powder was obtained.

EXAMPLE 3

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 416 g (10.4 moles), and bisphenol A was dissolved therein at 15° C.

Phosgene 455 g (4.6 moles) was fed to said mixture over 30 min with stirring and then said mixture was stirred for 20 min. To said mixture was added a dichloromethane solution 50 ml containing p-tert-butylphenol 20.7 g (3.44 mole % based on one mole of bisphenol A) and triethylamine 0.32 g (0.08 mole % based on one mole of bisphenol A), followed by stirring for 30 min and then the reaction was completed.

A further procedure was carried out in the same manner as in Example 1 and then aromatic polycarbonate powder was obtained.

EXAMPLE 4

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension were added 1.5 liters of an aqueous solution containing sodium hydrosulfite 1.8 g and sodium hydroxide 448 g (11.2 moles), and bisphenol A was dissolved therein at 15° C.

Phosgene 475 g (4.8 moles) was fed to said mixture with stirring over 30 min. Then, triethylamine 0.16 g (0.04 mole % based on one mole of bisphenol A) was added to said mixture, followed by stirring for 15 min. To said mixture was added a dichloromethane solution 50 ml containing p-tert-butylphenol 20.7 g (3.44 mole % based on one mole of bisphenol A), followed by stirring for 30 min and the reaction was completed.

A further procedure was carried out in the same manner as in Example 1 and then aromatic polycarbonate powder was obtained.

EXAMPLE 5

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 435 g (10.88 moles), and bisphenol A was dissolved therein at 15° C.

Phosgene 467 g (4.72 moles) was fed to said mixture with stirring over 30 min. Then, triethylamine 0.12 g (0.03 mole % based on one mole of bisphenol A) was added to said mixture, followed by stirring for 15 min. To said mixture was added a dichloromethane solution 50 ml containing p-tert-butylphenol 13.1 g (2.18 mole % based on one mole of bisphenol A) and triethylamine 0.32 g (0.08 mole % based on one mole of bisphenol A), followed by stirring for 30 min and the reaction was completed.

A further procedure was carried out in the same manner as in Example 1 and then aromatic polycarbonate powder was obtained.

EXAMPLE 6

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 435 g (10.88 moles), and bisphenol A was dissolved therein at 15° C.

Phosgene 467 g (4.72 moles) was fed to said mixture with stirring over 30 min. Then, triethylamine 0.16 g (0.04 mole % based on one mole of bisphenol A) was added to said mixture, followed by stirring for 30 min. To said mixture was added dichloromethane solution 50 ml containing p-tert-butylphenol 31.1 g (5.18 mole % based on one mole of bisphenol A) and triethylamine 0.32 g (0.08 mole % based on one mole of bisphenol A) and then the resultant mixture was stirred for 30 min and the reaction was completed.

A further procedure was carried out in the same manner as in Example 1 and then aromatic polycarbonate powder was obtained.

EXAMPLE 7

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 435 g (10.88 moles), and bisphenol A was dissolved therein at 15° C.

Phosgene 467 g (4.72 moles) was fed to said mixture with stirring over 30 min. Then, triethylamine 0.2 g (0.05 mole % based on one mole of bisphenol A) was added to said mixture, followed by stirring for 30 min. To said mixture was added a dichloromethane solution 50 ml containing p-tert-butylphenol 20.7 g (3.44 mole % based on one mole of bisphenol A) and triethylamine 0.32 g (0.08 mole % based on one mole of bisphenol A), followed by stirring for 30 min and the reaction was completed.

A further procedure was carried out in the same manner as in Example 1 and then aromatic polycarbonate powder was obtained.

EXAMPLE 8

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 2.2 liters of an aqueous solution containing sodium hydrosulfite 1.2 g and sodium hydroxide 397 g (9.92 moles), and bisphenol A was dissolved therein at 15° C.

Phosgene 459 g (4.64 moles) was fed to said mixture with stirring over 60 min. Then, triethylamine 0.64 g (0.16 mole % based on one mole of bisphenol A) was added to said mixture, followed by stirring for 30 min. To said mixture was added an aqueous solution 1 liter containing p-tert-butylphenol 20.7 g (3.44 mole % based on one mole of bisphenol A) and sodium hydroxide 25 g (0.63 mole) and the resultant mixture was stirred for 30 min to complete the reaction.

A further procedure was carried out in the same as in Example 1 and then aromatic polycarbonate powder was obtained.

EXAMPLE 9

A 10 liter-flask having baffles was equipped with a stirrer having three-step six vanes and a reflux condenser. To the flask were added bisphenol A 436 g (1.91 moles) and water 3 liters, and then the flask was purged with nitrogen to remove oxygen in the flask. To the above-mentioned suspension was added 2.2 liters of an aqueous solution containing sodium hydrosulfite 1.2 g and sodium hydroxide 162 g (4.04 moles), and bisphenol A was dissolved therein at 15° C.

To the resulting mixture were added, with stirring, 4 liters of a dichloromethane solution containing bischloroformate derivative of bisphenol A 738 g (2.09 moles) and then triethylamine 0.64 g (0.16 mole % based on one mole of bisphenol A), and the mixture thus prepared was stirred for 30 min.

Then, to the mixture thus stirred was added one liter of an aqueous solution of p-tert-butylphenol 20.7 g (3.44 mole % based on one mole of bisphenol A), sodium hydroxide 25 g (0.63 mole) and sodium hydrosulfite 0.08 g. The resulting mixture was stirred for 30 min to complete the reaction.

A further procedure was carried out in the same manner as in Example 1 and then aromatic polycarbonate powder was obtained.

EXAMPLE 10

A 10 liter-flask having baffles was equipped with a stirrer having three-step six vanes and a reflux condenser. To the flask were added bisphenol A 436 g (1.91 moles) and water 3 liters, and then the flask was purged with nitrogen to remove oxygen in the flask. To the above-mentioned suspension was added 2.2 liters of an aqueous solution containing sodium hydrosulfite 1.2 g and sodium hydroxide 162 g (4.04 moles), and bisphenol A was dissolved therein at 15° C.

To said mixture was added 4 liters of a dichloromethane solution containing bischloroformate derivative of bisphenol A 738 g (2.09 moles) and the resulting mixture was stirred for 30 min. Then, to said mixture was added an aqueous solution 1 liter containing p-tert-butylphenol 20.7 g (3.44 mole % based on one mole of bisphenol A), triethylamine 0.64 g (0.16 mole % based on one mole of bisphenol A), sodium hydroxide 25 g (0.63 mole) and sodium hydrosulfite 0.08 g, followed by stirring for 30 min to complete the reaction. A further procedure was carried out in the same manner as in Example 1 and then aromatic polycarbonate powder was obtained.

EXAMPLE 11

A 10 liter-flask having baffles was equipped with a stirrer having three-step six vanes and a reflux condenser. To the flask were added bisphenol A 438 g (1.92 moles) and water 3 liters, and then the flask was purged with nitrogen to remove oxygen in the flask. To the above-mentioned suspension was added 1.5 liters of an aqueous solution containing sodium hydrosulfite 1.8 g and sodium hydroxide 192 g (4.8 moles), and bisphenol A was dissolved therein at 15° C.

To the resulting mixture were added, with stirring, triethylamine 0.2 g (0.05 mole % based on one mole of bisphenol A) and 4 liters of dichloromethane solution containing bischloroformate derivative of bisphenol A 735 g (2.08 moles), followed by stirring for 30 min. Then, to said mixture was added a dichloromethane solution 50 ml containing p-tert-butylphenol 21.6 g (3.60 mole % based on one mole of bisphenol A) and triethylamine 0.32 g (0.08 mole % based on one mole of bisphenol A), followed by stirring for 30 min to complete the reaction.

A further procedure was carried out in the same manner as in Example 1 and then aromatic polycarbonate powder was obtained.

EXAMPLE 12

There was employed a tank-type continuous reaction apparatus composed of four flasks each of which is a 4-liter flask having baffles and equipped with a stirrer having three-step six vanes and a reflux condenser, the flasks being connected in series with the outlet for overflow. To the first tank were fed with stirring total 23.4 kg of an aqueous solution composed of bisphenol A 3653 g (16 moles), sodium hydroxide 1746 g (43.65 moles), sodium hydrosulfite 7.2 g dissolved in water 18 kg, phosgene and dichloromethane at feeding speeds of 97.50 g/min, 7.78 g/min (0.0786 mole/min) and 88.67 g/min, respectively. After a residence time of about 30 min, the mixture was discharged to the second tank at a speed of 194.0 g/min. Then, after the same residence time as above, the mixture was discharged to the third tank and subsequently to the fourth tank.

When the discharge to the second tank started, 210 ml of an aqueous solution containing triethylamine 0.567 g (0.0056 mole) was fed to the second tank at a speed of 1 ml/min. To the third tank was fed 180 ml of a dichloromethane solution containing p-tert-butylphenol 62.0 g (0.413 mole) and triethylamine 0.97 g (0.0096 mole) at a speed of 1 ml/min. A part of the reaction mixture discharged from the second tank was taken out upon starting to feed p-tert-butylphenol and there were determined a weight-average molecular weight of prepolymer, a residual amount of bisphenol A, and the amount ratio of a bischloroformate compound A to a prepolymer. The results are shown in Table 1.

From starting to feed the mixture to the first tank, the operation was carried out continuously for 4 hours. Meanwhile, a part of each of the reaction mixtures continuously discharged from the second and fourth tanks was taken out every 30 min. According to the determination of weight-average molecular weights, the same results were always obtained with stability. Then, the reaction mixture discharged from the fourth tank was separated to remove a aqueous phase. The resulting organic phase was neutralized with hydrochloric acid and washed repeatedly with water until electrolytes disappeared. To the resulting dichloromethane solution containing the resulting aromatic polycarbonate were added toluene 5 liters and water 12.5 liters, and the solution was heated up to 98° C. to distill away dichloromethane and toluene and aromatic polycarbonate powder was obtained.

COMPARATIVE EXAMPLE 1

(A method disclosed in U.S. Pat. No. 3,275,601)

A 10 liter-flask having baffles was equipped with a stirrer having three-step six vanes and a reflux condenser. To the flask were added bisphenol A 912 g (4.0 moles), p-tert-butylphenol 20.7 g (3.44 mole % based on one mole of bisphenol A), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 436 g (10.91 moles), and bisphenol A was dissolved therein at 15° C.

Phosgene 467 g (4.72 moles) was fed to said mixture with stirring over 30 min. Then, triethylamine 0.32 g (0.08 mole % based on one mole of bisphenol A) was added to the resulting mixture, followed by stirring for 60 min to complete the reaction.

A further procedure was carried out in the same manner as in Example 1 and then aromatic polycarbonate powder was obtained.

COMPARATIVE EXAMPLE 2

A 10 liter-flask having baffles was equipped with a stirrer having three-step six vanes and a reflux condenser. To the flask were added bisphenol A 912 g (4.0 moles), dichloromethane 4 liters and water 4 liters, and then the flask was purged with nitrogen to remove oxygen in the flask. To the above-mentioned suspension was added 1.5 liters of an aqueous solution containing sodium hydrosulfite 1.8 g and sodium hydroxide 436 g (10.91 moles), and bisphenol A was dissolved therein at 15° C.

Phosgene 467 g (4.72 moles) was fed to the resulting mixture with stirring over 30 min. Immediately thereafter, to the mixture was added 50 ml of a dichloromethane solution containing p-tert-butylphenol 20.7 g (3.44 mole % based on one mole of bisphenol A) and triethylamine 0.32 g (0.08 mole % based on one mole of bisphenol A), followed by stirring for 60 min to complete the reaction.

A further procedure was carried out in the same manner as in Example 1 and then aromatic polycarbonate powder was obtained.

COMPARATIVE EXAMPLE 3

(A method disclosed in Japanese Patent Application Laid-open No. Sho 62-89723)

A 10 liter-flask having baffles was equipped with a stirrer having three-step six vanes and a reflux condenser. To the flask were added bisphenol A 1115 g (4.88 moles) and dichloromethane 3.38 liters, and then the flask was purged with nitrogen to remove oxygen in the flask. To the abovementioned suspension was added 5 liters of an aqueous solution containing sodium hydroxide 535 g (13.4 moles), and bisphenol A was dissolved therein.

Phosgene 560 g (5.66 moles) was fed to said mixture with stirring over 90 min at a reaction temperature of 25°±1° C. Then, to the resulting mixture was added 300 ml of an aqueous solution containing p-tert-butylphenol 18.8 g (2.57 mole % based on one mole of bisphenol A) and sodium hydroxide 6 g (0.15 mole). Table 1 shows a weight-average molecular weight of prepolymer, a residual amount of bisphenol A, and the amount ratio of a bischloroformate compound to a prepolymer when an endcapping agent was added for the first time.

The mixture was stirred at 8000 r.p.m. for 2 min to form a highly emulsified state using an SL-type homomixer (manufactured by Tokushu Kika Kogyo). The resulting emulsion was stirred again for 20 min with the stirrer having three-step six vanes. To the emulsion was added 100 ml of a dichloromethane solution containing p-tert-butylphenol 14.1 g (1.92 mole % based on one mole of bisphenol A), followed by stirring for 110 min to complete the reaction.

A further procedure was carried out in the same manner as in Example 1 and then aromatic polycarbonate powder was obtained.

COMPARATIVE EXAMPLE 4

(A method disclosed in U.S. Pat. No. 4,737,573)

A 10 liter-flask having baffles was equipped with a stirrer having three-step six vanes, a pH probe and a reflux condenser. To the flask were added bisphenol A 1140 g (5.0 moles) and dichloromethane 5 liters, and then the flask was heated to 30° C. and purged with nitrogen to remove oxygen in the flask.

Phosgene 742 g (7.5 moles) was fed to the mixture over 20 min with stirring. At the same time, 50 wt % aqueous sodium hydroxide solution was added to the mixture in order to maintain the pH of about 9.5. The flask was purged with nitrogen for 5 min while the sodium hydroxide solution was added continuously to maintain the pH of about 9.5.

To the reaction mixture was fed 300 ml of a dichloromethane solution containing phenol 29.3 g (6.22 mole % based on one mole of bisphenol A) as an endcapping agent and triethylamine 5.06 g (1 mole % based on one mole of bisphenol A) over 5 min. At the same time, 50 wt % sodium hydroxide solution was added to the mixture to maintain the pH of 12. After completion of feeding, the mixture was stirred for further 20 min and then the reaction was completed.

A further procedure was carried out in the same manner as in Example 1 and then aromatic polycarbonate powder was obtained.

COMPARATIVE EXAMPLE 5

(A method disclosed in U.S. Pat. No. 4,743,676)

A 10 liter-flask having baffles was equipped with a stirrer having three-step six vanes, a pH probe and a reflux condenser. To the flask were added bisphenol A 456 g (2 moles) and dichloromethane 2 liters, and then the flask was heated to 30° C. and purged with nitrogen to remove oxygen in the flask.

Phosgene 297 g (3 moles) was fed to the mixture over 20 min with stirring. At the same time, 50 wt % sodium hydroxide solution was added to the mixture in order to maintain the pH of about 9.5. The reactor was purged with nitrogen for 5 min while the aqueous solution of sodium hydroxide was added to maintain the pH of about 9.5. By removing an aqueous phase from the reaction mixture, there was obtained 2 liters of a bischloroformate oligomer composition containing 2 moles of bisphenol A structure units.

To the resulting oligomer solution were added 3 liters of water, 20 g of sodium hydrogencarbonate and 4.5 g of phenol (2.4 mole % based on one mole of bisphenol A structure units). The oligomer solution was stirred for 20 min while the pH thereof was maintained at about 8.5 by adding 50 wt % aqueous solution of sodium hydroxide.

After adding 300 g of potassium hydroxide, there was fed 200 ml of a dichloromethane solution containing 2.02 g triethylamine (1 mole % based on one mole of bisphenol A structure units) over 5 min. Meanwhile, it was observed that dichloromethane was refluxed. After completion of feeding, the mixture was stirred for further 25 min and the reaction was completed.

A further procedure was carried out in the same, as in Example 1 and then aromatic polycarbonate powder was obtained.

COMPARATIVE EXAMPLE 6

(A method disclosed in U.S. Pat. No. 4,939,230)

There was used a 9.5 mm inner diameter tubular reactor equipped inside with three 150 mm long (9.5 mm in diameter) line mixers and one 305 mm long (9.5 mm in diameter) line mixer. To the tubular reactor were fed an aqueous solution composed of 675 g of bisphenol A (2.96 moles) and 236.8 g of sodium hydroxide (5.9 moles) dissolved in 3939 ml of water, phosgene and dichloromethane at flow rates of 29 g/min, 2.4 g/min (1.37 moles based on one mole of bisphenol A) and 17 g/min, respectively. The residence time was about 2 min and the feeding time was totally about 2.8 hours. An oligomer solution was obtained by removing an aqueous phase from the reaction mixture.

A 10 liter-flask having baffles was equipped with a stirrer having three-step six vanes and a reflux condenser. To the flask were added the oligomer solution, 3.2 liters of water and 300 ml of a dichloromethane solution containing 36.6 g of p-tert-butylphenol (8.23 mole % based on one mole of bisphenol A) and then the resulting mixture was stirred for 5 min, followed by adding 200 ml of an aqueous solution containing sodium hydroxide 185 g (4.63 moles) and then stirring for 5 min. To the resulting mixture was added 500 ml of a dichloromethane solution containing 3.89 g of triethylamine (1.3 mole 1% based on one mole of bisphenol A), and then the mixture was stirred for 30 min to complete the reaction.

A further procedure was carried out in the same manner as in Example 1 and then aromatic polycarbonate powder was obtained.

COMPARATIVE EXAMPLE 7

(A method disclosed in U.S. Pat. No. 4,973,664)

In the same manner as in Comparative Example 5, there was prepared 2 liters of an oligomer-like bischloroformate composition containing 2 moles of bisphenol A structural unit.

To the bischloroformate oligomer composition were added 3 liters of water, 40 g of sodium hydrogencarbonate, 40 ml of 50 wt % aqueous sodium hydroxide solution and 8.47 g of phenol (4.5 mole % based on one mole of bisphenol A structural units) and the resulting mixture was stirred for 15 min. Meanwhile, the pH thereof was maintained in the range of 8.5–9.5.

To the mixture were added 200 ml of a dichloromethane solution containing triethylamine 0.344 g (0.17 mole % based on one mole of bisphenol A) and 300 g of solid potassium hydroxide. The mixture was stirred for 15 min while the pH thereof was maintained at about 12.3 and the reaction was completed.

A further procedure was carried out in the same manner as in Example 1 and then aromatic polycarbonate powder was obtained.

COMPARATIVE EXAMPLE 8

(A method disclosed in U.S. Pat. No. 5,034,505)

A 10 liter-flask having baffles was equipped with a stirrer having three-step six vanes, a pH probe and a reflux condenser. To the flask were added bisphenol A 707.7 g (3.1 moles) and dichloromethane 4.2 liters, and then the flask was heated to 30° C. and purged with nitrogen to remove oxygen in the flask.

Phosgene 460 g (4.65 moles) was fed to the mixture over 20 min with stirring. At the same time, 50 wt % aqueous sodium hydroxide solution was added to the mixture in order to maintain the pH of about 9.5. The reactor was purged with nitrogen for 5 min while an aqueous sodium hydroxide solution was added to maintain the pH of about 9.5. By removing an aqueous phase from the reaction mixture, there was obtained 4.2 liters of a solution containing a bischloroformate oligomer composition containing 3.1 moles of bisphenol A structural units.

To the solution were added 1.8 liters of water and 3 N aqueous hydrochloric acid solution to maintain a pH in the range of 3–4. After stirring for 3 min, to the resulting solution was added 50 ml of a dichloromethane solution containing 13.1 g of phenol (4.5 mole % based on one mole of bisphenol A structural units) and 1.57 g of triethylamine (0.5 mole % based on one mole of bisphenol A structural units). When adding 90 ml of 50 wt % aqueous sodium hydroxide solution, the reaction mixture became a non-emulsion state. Further, aqueous sodium hydroxide solution was added to maintain a pH in the range of 11–12 and stirred for 30 min. Moreover, pH was raised up to 12–12.5 by adding an aqueous sodium hydroxide solution and the resulting mixture was stirred for 30 min and the reaction was completed.

A further procedure was carried out in the same manner as in Example 1 and then aromatic polycarbonate powder was obtained.

COMPARATIVE EXAMPLE 9

(A method disclosed in European Patent Application Publication No. 502515)

A 10 liter-flask having baffles was equipped with a stirrer having three-step six vanes and a reflux condenser. To the flask were added bisphenol A 912 g (4 moles), 2.1 g of sodium hydrosulfite, 438 g of sodium hydroxide (10.95 moles) and 2.8 liters of dichloromethane and dissolved in 4 liters of water.

Phosgene 459 g (4.64 moles) was fed to the mixture with stirring over 90 min at a reaction temperature of 25±1° C. Then, to the mixture was added 250 ml of an aqueous solution containing p-tert-butylphenol 16.67 g (2.78 mole % based on one mole of bisphenol A) and 3.2 g of sodium hydroxide (0.08 mole).

The mixture was stirred at 8000 r.p.m. for 2 min to form a highly emulsified state using a SL-type homomixer and the resulting emulsion was allowed to stand for 2 hours without stirring while keeping a temperature of 30±1° C., and then the reaction was completed.

A further procedure was carried out in the same manner as in Example 1 and then aromatic polycarbonate powder was obtained.

COMPARATIVE EXAMPLE 10

(A method disclosed in U.S. Pat. No. 4,880,896)

To 100 g of aromatic polycarbonate powder obtained by the method described in Comparative Example 1 was added 225 g of acetone and the resulting mixture was stirred for an hour at 50° C. After an acetone phase was removed by filtration, the powder was dried at 120° C. for 20 hours under reduced pressure of 30–1 mmHg.

With respect to each example and comparative example, Table 1 shows a weight-average molecular weight (Mw) of prepolymer, degree of attainment (%), i.e., the ratio of a weight-average molecular weight of prepolymer reached actually to a weight-average molecular weight to be reached finally, a residual amount of bisphenol A (wt %, based on the initial amount thereof), and an amount (wt %) of a bischloroformate compound (BCF) which is a bishaloformate derivative of bisphenol A based on prepolymer when adding an endcapping agent. Table 2 shows a weight-average molecular weight (Mw), a molecular weight distribution [the ratio (Mw/Mn) of a weight-average molecular weight to a number-average molecular weight, the smaller the Mw/Mn, the narrower the molecular weight distribution.], content (wt %) of a low molecular weight oligomer having a molecular weight of 3000 or less, and a glass transition temperature (Tg, ° C.) of the aromatic polycarbonate powder.

Each measurement method is shown below.

Measurement of a residual amount of BPA:

After taking a part of a reaction mixture, the aqueous phase thereof was analyzed by high performance liquid chromatography and then a residual amount (wt %) of BPA was calculated from the result obtained.

Measurements of a weight-average molecular weight, degree of attainment, an amount of BCF based on prepolymer, a molecular weight distribution, content of a low molecular weight oligomer:

A reaction mixture was left still and an organic phase was separated therefrom. The organic phase was neutralized by hydrochloric acid and washed with water until electrolytes disappear. Afterward, prepolymer or an aromatic polycarbonate was obtained by distilling away dichloromethane. 0.02 g of the prepolymer or the aromatic polycarbonate obtained was dissolved in 10 g of chloroform. The resulting solution was measured by GPC [gel permeation chromatography GPC system-11, made by Showa Denko K.K.]. With respect to prepolymer, there were measured a weight-average molecular weight (Mw), degree of attainment (%) and an amount (wt %) of BCF based on prepolymer. With respect to an aromatic polycarbonate, there were measured a weight-average molecular weight (Mw), a molecular weight distribution (Mw/Mn), content (wt %) of a low molecular weight oligomer having the molecular weight of 3000 or less.

Glass transition temperature (Tg, ° C.):

A glass transition temperature was measured at a temperature raising rate of 16° C./min by DSC [DSC-3100, made by Mac Science K.K.].

TABLE 1

| | Mw of Prepolymer | Degree of Attainment (%) | Residual Amout of BPA (wt %) | Amount of BCF to Prepolymer (wt %) |
|---|---|---|---|---|
| Example 1 | 10500 | 20.2 | 3.1 | 3.8 |
| Example 2 | 7000 | 13.6 | 2.6 | 4.4 |
| Example 3 | 9500 | 18.3 | 3.2 | 2.2 |
| Example 4 | 21200 | 41.1 | 1.3 | 3.2 |
| Example 5 | 14900 | 19.0 | 2.1 | 2.3 |
| Example 6 | 28100 | 92.1 | 0.5 | 0.7 |
| Example 7 | 41700 | 80.0 | 0.0 | 0.3 |
| Example 8 | 29100 | 55.9 | 0.7 | 0.8 |
| Example 9 | 28000 | 53.4 | 0.0 | 0.2 |
| Example 10 | 18300 | 34.9 | 0.0 | 0.5 |
| Example 11 | 45300 | 96.4 | 0.0 | 0.1 |
| Example 12 | 32500 | 62.5 | 0.0 | 0.1 |
| Comparative Example 1 | 200 | 0.4 | 100 | — |
| Comparative Example 2 | 2300 | 4.5 | 12.7 | 13.4 |
| Comparative Example 3 | 2500 | 6.4 | 13.5 | 11.9 |
| Comparative Example 4 | 1400 | 4.5 | 5.6 | 30.1 |
| Comparative Example 5 | 1400 | 2.0 | 5.6 | 30.1 |
| Comparative Example 6 | 1700 | 9.8 | 10.5 | 22.9 |
| Comparative Example 7 | 1400 | 3.6 | 5.6 | 30.1 |
| Comparative Example 8 | 1800 | 4.9 | 5.4 | 19.2 |
| Comparative Example 9 | 2600 | 4.2 | 11.6 | 12.9 |
| Comparative Example 10 | — | — | — | — |

TABLE 2

| | Mw of Product | Molecular Weight Distribution (Mw/Mn) | Content of Low Molecular Weight Oligomer (wt %) | Glass Transition Temperature (°C.) |
|---|---|---|---|---|
| Example 1 | 52100 | 2.03 | 0.99 | 152 |
| Example 2 | 51600 | 2.03 | 0.98 | 152 |
| Example 3 | 52000 | 2.02 | 0.97 | 152 |
| Example 4 | 51600 | 1.98 | 0.95 | 152 |
| Example 5 | 78400 | 2.06 | 0.99 | 155 |
| Example 6 | 30500 | 1.95 | 0.93 | 147 |
| Example 7 | 52100 | 1.93 | 0.90 | 153 |
| Example 8 | 52400 | 2.02 | 0.95 | 153 |
| Example 9 | 52400 | 1.98 | 0.88 | 153 |
| Example 10 | 52000 | 1.98 | 0.88 | 153 |
| Example 11 | 47000 | 1.93 | 0.86 | 151 |
| Example 12 | 51800 | 1.99 | 0.97 | 153 |
| Comparative Example 1 | 51800 | 2.52 | 3.02 | 150 |
| Comparative Example 2 | 51000 | 2.36 | 3.11 | 150 |
| Comparative Example 3 | 39100 | 2.34 | 3.29 | 144 |
| Comparative Example 4 | 31000 | 2.30 | 3.41 | 144 |
| Comparative Example 5 | 70100 | 2.67 | 3.11 | 153 |
| Comparative Example 6 | 17400 | 2.36 | 4.59 | 135 |
| Comparative Example 7 | 38800 | 2.31 | 3.13 | 144 |
| Comparative Example 8 | 36500 | 2.34 | 3.11 | 144 |
| Comparative Example 9 | 61300 | 2.61 | 3.08 | 151 |
| Comparative Example 10 | 52700 | 2.25 | 2.11 | 151 |

Examples 1-12 indicate that by the production method of the present invention, there can be prepared suitably an aromatic polycarbonate having less content of a low molecular weight oligomer, a narrow molecular weight distribution and an excellent heat resistance.

In addition, Examples 1-12 and Comparative Examples 1 and 2 show that timing when adding an endcapping agent is very important for the preparation of an aromatic polycarbonate having less content of a low molecular weight oligomer in the present invention.

Example 12 shows that the preparation method of the present invention can be carried out suitably using a tank-type continuous reaction apparatus.

Comparative Examples 1 and 3-9 show that by a conventional preparation method, there can be prepared only an aromatic polycarbonate having a large content of a low molecular weight oligomer.

Comparative Example 10 shows that an aromatic polycarbonate obtained in accordance with the present invention has less content of a low molecular weight oligomer, a narrow molecular weight distribution and an excellent heat resistance compared with an acetone-treated aromatic polycarbonate obtained by a conventional production method.

As is clear from the above-mentioned results, the production method of the present invention can produce an aromatic polycarbonate having less content of a low molecular weight oligomer, a narrow molecular weight distribution and an excellent heat resistance compared with a conventional production method.

What is claimed is:

1. A method for preparing an aromatic polycarbonate which comprises the steps of:

(A) conducting an interfacial polymerization reaction in a reaction system comprising at least one aromatic dihydroxy compound, a carbonate precursor, an alkali metal or alkaline earth metal base, water and a substantially inert, substantially water-insoluble organic solvent in the absence of an endcapping agent, the molar amount of the carbonate precursor being 0.9 to 2.0 times that of aromatic dihydroxy compounds when carbonyl halide compounds are used as carbonate precursors, and when haloformate compounds are employed as carbonate precursors, the number of haloformate groups contained in the haloformate compounds being 0.9 to 1.5 equivalents based on that of hydroxy groups contained in the haloformate compounds and the aromatic dihydroxy compounds, and (B) conducting an interfacial polymerization reaction with the addition of an endcapping agent after at least one of the following conditions is met:

(1) the weight-average molecular weight of the prepolymer obtained in step A, reaches 20% or more of that of the final product, (2) the residual amount of the aromatic dihydroxy compound which is contained in the reaction mixture obtained in step A, reaches 3% by weight or less of the initial amount, and (3) the amount of the bishaloformate compound contained in the reaction mixture obtained in step A reaches 3% by weight or less based on the prepolymer wherein the bishaloformate compound is a bishaloformate derivative of the dihydroxy compound, wherein the endcapping agent reacts with end groups of the prepolymer produced in step A so as to cap the ends thereof.

2. A method according to claim 1 wherein the endcapping agent is added when the weight-average molecular weight of the prepolymer obtained in step A reaches the range of 20–99% of that to be reached finally.

3. A method according to claim 1 wherein the endcapping agent is added when the weight-average molecular weight of the prepolymer obtained in step A reaches the range of 35–95% of that to be reached finally.

4. A method according to claim 1 wherein the endcapping agent is added after the residual amount of the aromatic dihydroxy compound which is contained in the reaction mixture obtained in step A reaches 3% by weight or less of an initial amount and the amount of the bishaloformate compound contained in the reaction mixture obtained in step A reaches 3% by weight or less based on the prepolymer wherein the bishaloformate compound is a bishaloformate derivative of the dihydroxy compound.

5. A method according to claim 1 wherein a tertiary amine, a quaternary ammonium salt, a tertiary phosphine, a quaternary phosphonium salt, a nitrogen-containing heterocyclic compound and salt thereof, an imino ether and salt thereof, or a compound having amido groups is employed as a polycarbonate formation catalyst.

6. A method according to claim 5 wherein the reaction system in step A contains the polycarbonate formation catalyst.

7. A method according to claim 5 wherein the polycarbonate formation catalyst is introduced simultaneously with or after the addition of the endcapping agent in step B.

8. A method according to claim 5 wherein the reaction system in step A contains the polycarbonate formation catalyst and further the polycarbonate formation catalyst is introduced simultaneously with or after the addition of the endcapping agent in step B.

9. A method according to claim 1 wherein the amount of the alkali metal or alkaline earth metal base is 1.0–1.6 equivalents based on the aromatic dihydroxy compound.

10. A method according to claim 9 wherein a part of the alkali metal or alkaline earth metal base is introduced simultaneously with or after the addition of the endcapping agent in step B.

11. A method according to claim 1 wherein the number of haloformate groups is excessive to the number of hydroxyl groups in the reaction mixture obtained in step A.

12. A method according to claim 1 wherein the finally reached weight-average molecular weight is in the range of 15000–150000.

13. An aromatic polycarbonate obtained by the method of claim 1.

14. An aromatic polycarbonate according to claim 13 wherein a low molecular weight oligomer having a molecular weight of 3000 or less is contained in an amount of less than 1% by weight and a weight-average molecular weight is in the range of 15000–150000.

15. A method for preparing an aromatic polycarbonate which comprises the steps of:
(A) preparing a prepolymer having the number of haloformate groups in excess of the number of hydroxy groups by conducting an interfacial polymerization reaction in a reaction system comprising at least one aromatic dihydroxy compound, a carbonate precursor, an alkali metal or alkaline earth metal base, water and a substantially inert, substantially water-insoluble organic solvent in the absence of an endcapping agent; the molar amount of the carbonate precursor being 0.9 to 2.0 times that of aromatic dihydroxy compounds when carbonyl halide compounds are used as carbonate precursors, and when haloformate compounds are employed as carbonate precursors, the number of haloformate groups contained in the haloformate compounds being 0.9 to 1.5 equivalents based on that of hydroxy groups contained in the haloformate compounds and the aromatic dihydroxy compounds, and
(B) adding an endcapping agent when a weight-average molecular weight of the prepolymer obtained in step A reaches 20–99% of that of final product and further conducting the interfacial polymerization reaction to completion.

16. A method for preparing an aromatic polycarbonate which comprises adding an endcapping agent after at least one of condition (1) and (2) are met in a reaction system comprising at least one aromatic dihydroxy compound, a carbonate precursor, an alkali metal or alkaline earth metal base, water and an organic solvent in the absence of an endcapping agent; the molar amount of the carbonate precursor being 0.9 to 2.0 times that of aromatic dihydroxy compounds when carbonyl halide compounds are used as carbonate precursors, and when haloformate compounds are employed as carbonate precursors, the number of haloformate groups contained in the haloformate compounds being 0.9 to 1.5 equivalents based on that of hydroxy groups contained in the haloformate compounds and the aromatic dihydroxy compounds:
(1) a residual amount of the aromatic dihydroxy compound reaches 3% by weight or less of an initial amount,
(2) an amount of a bishaloformate compound which is a bishaloformate derivative of a dihydroxy compound reaches 3% by weight or less of a prepolymer.

17. An aromatic polycarbonate which contains less than 1% by weight of a low molecular weight oligomer having molecular weight of 3000 or less and has a weight-average molecular weight in the range of 15000–150000.

18. A method according to claim 1 wherein a polycarbonate formation catalyst is employed.

19. A method according to claim 18 wherein the reaction system in step A contains the polycarbonate formation catalyst.

20. A method according to claim 18 wherein the polycarbonate formation catalyst is introduced simultaneously with or after the addition of the endcapping agent in step B.

21. A method according to claim 18 wherein the reaction step in step A contains the polycarbonate formation catalyst and further the polycarbonate formation catalyst is introduced simultaneously with or after the addition of the endcapping agent in step B.

* * * * *